(12) United States Patent
Matsumoto et al.

(10) Patent No.: US 12,065,561 B2
(45) Date of Patent: Aug. 20, 2024

(54) RESIN COMPOSITION, MOLDED ARTICLE, ELECTRONIC COMPONENT, AND ELECTRONIC DEVICE

(71) Applicant: RICOH COMPANY, LTD., Tokyo (JP)

(72) Inventors: Mitsuyo Matsumoto, Kanagawa (JP); Yoshitaka Sekiguchi, Kanagawa (JP); Natsuki Koike, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 317 days.

(21) Appl. No.: 17/338,052

(22) Filed: Jun. 3, 2021

(65) Prior Publication Data

US 2021/0395496 A1    Dec. 23, 2021

(30) Foreign Application Priority Data

Jun. 23, 2020   (JP) ................................. 2020-107899

(51) Int. Cl.
| | | |
|---|---|---|
| C08L 5/00 | (2006.01) | |
| C08K 3/32 | (2006.01) | |
| C08K 5/523 | (2006.01) | |
| C08K 5/5313 | (2006.01) | |
| C08K 5/5399 | (2006.01) | |
| C08L 23/12 | (2006.01) | |

(52) U.S. Cl.
CPC ............... *C08L 5/00* (2013.01); *C08K 3/32* (2013.01); *C08K 5/5313* (2013.01); *C08K 5/5399* (2013.01); *C08L 23/12* (2013.01); C08K 2003/323 (2013.01); C08L 2201/02 (2013.01); C08L 2203/20 (2013.01)

(58) Field of Classification Search
CPC ........ C08L 5/00; C08L 23/12; C08L 2201/02; C08L 2203/20; C08K 3/32; C08K 5/5313; C08K 5/5399; C08K 2003/323; C08K 5/523; C08B 37/0024
See application file for complete search history.

(56) References Cited

U.S. PATENT DOCUMENTS

| | | |
|---|---|---|
| 2007/0270527 A1 | 11/2007 | Horie et al. |
| 2011/0105649 A1 | 5/2011 | Harada et al. |
| 2014/0275397 A1 | 9/2014 | Akiba et al. |
| 2014/0371359 A1 | 12/2014 | Akiba et al. |
| 2017/0152368 A1 | 6/2017 | Akiba et al. |
| 2018/0044440 A1* | 2/2018 | Shibakami .......... C08B 37/0024 |
| 2018/0273731 A1 | 9/2018 | Opietnik et al. |
| 2021/0009799 A1 | 1/2021 | Koike et al. |

FOREIGN PATENT DOCUMENTS

| | | | |
|---|---|---|---|
| CN | 101389686 | 3/2009 | |
| CN | 101864155 | 10/2010 | |
| CN | 107207626 | 9/2017 | |
| JP | S51-062838 | 5/1976 | |
| JP | 9-324105 | 12/1997 | |
| JP | 2005-023260 | 1/2005 | |
| JP | 2010-031229 | 2/2010 | |
| JP | 2014-051563 | 3/2014 | |
| JP | 2017-218566 | 12/2017 | |
| JP | 2019-073600 | 5/2019 | |
| JP | 2021-014527 | 2/2021 | |
| WO | 2018/098065 | 5/2009 | |
| WO | WO-2011152371 A1 * | 12/2011 | .............. C08L 67/04 |
| WO | 2019/164669 | 8/2019 | |
| WO | 2020/013232 | 1/2020 | |

OTHER PUBLICATIONS

Ashter, S. A., Thermoforming of Single and Multilayer Laminates, Plastic Films Technologies, Testing, and Applications, Chapter 7 Characterization, Elsevier Inc., 2014, 147-192 (Year: 2014).*

China chemicals statistics, vol. 25, 2009, with partial English translation, 5 pages.

Extended European Search Report issued Nov. 19, 2021 in European Application No. 21177613.3, 7 pages.

Gan et al., "Syntheses, properties and molecular conformation of paramylon ester derivates", Polymer Degradation and Stability, vol. 145, 2017, pp. 142-149.

Japanese Office Action dated Jan. 24, 2024, in Japanese Application No. 2020-107899, with English translation, 9 pages.

Chinese Office Action dated Jul. 5, 2022, in Chinese Application No. 202110645153.1, with English translation, 15 pages.

* cited by examiner

*Primary Examiner* — Eric Olson
*Assistant Examiner* — Samuel L Galster
(74) *Attorney, Agent, or Firm* — Grüneberg and Myers PLLC

(57) ABSTRACT

A resin composition is provided that comprises a resin and a phosphorus-based flame retardant. The resin includes a β-1,3-glucan derivative resin having a main chain having a structure represented by the following structural formula (1):

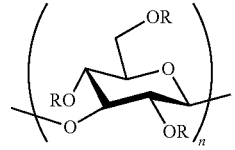

Structural Formula (1)

where each of Rs is independently a hydrogen atom or an alkylcarbonyl group, at least one of Rs is an alkylcarbonyl group, and n is a natural number. The phosphorus-based flame retardant has an average particle diameter of 5 μm or less in the resin.

9 Claims, No Drawings

RESIN COMPOSITION, MOLDED ARTICLE, ELECTRONIC COMPONENT, AND ELECTRONIC DEVICE

CROSS-REFERENCE TO RELATED APPLICATIONS

This patent application is based on and claims priority pursuant to 35 U.S.C. § 119(a) to Japanese Patent Application No. 2020-107899, filed on Jun. 23, 2020 in the Japan Patent Office, the entire disclosure of which is hereby incorporated by reference herein.

BACKGROUND

Technical Field

The present disclosure relates to a resin composition, a molded article, an electronic component, and an electronic device.

Description of the Related Art

In recent years, bio-based polymers synthesized from renewable resources have been attracting attention. Paramylon produced by photosynthesis of microalgae such as *Euglena* and curdlan produced in a growth medium by bacteria by fermentation are straight chain high-molecular-weight polysaccharides composed of β-1,3-glucan. In previous studies, it is known that new fibers can be obtained by introducing an ester group for the purpose of application as a plastic and synthesizing a paramylon ester derivative by chemical modification.

SUMMARY

In accordance with some embodiments of the present invention, a resin composition is provided. The resin composition comprises a resin and a phosphorus-based flame retardant. The resin includes a β-1,3-glucan derivative resin having a main chain having a structure represented by the following structural formula (1):

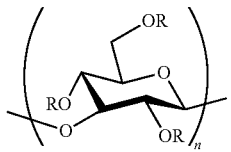

Structural Formula (1)

where each of Rs is independently a hydrogen atom or an alkylcarbonyl group, at least one of Rs is an alkylcarbonyl group, and n is a natural number. The phosphorus-based flame retardant has an average particle diameter of 5 μm or less in the resin.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In accordance with some embodiments of the present invention, a resin composition comprising a β-1,3-glucan derivative resin is provided, which is capable of achieving both mechanical strength and flame retardancy.

Descriptions of Raw Materials

β-1,3-Glucan

β-1,3-glucan is a polysaccharide mainly produced by algae and fungi.

β-1,3-glucan, in which glucose is bonded with β-1,3-bond, is similar to cellulose, in which glucose is bonded with β-1,4-bond, in binding patterns of glucose. Also, β-1,3-glucan and cellulose are similar in that they have no thermoplasticity. However, β-1,3-glucan and cellulose are different in their polymer chain structure: the polymer chain of β-1,3-glucan can take a triple helix structure, while that of cellulose takes a sheet-like structure.

Due to this difference in structure, β-1,3-glucan has unique physical properties and reaction characteristics different from those of cellulose. β-1,3-glucan is easy to purify, and the purification step can be carried out under milder conditions than that for cellulose.

Plant cellulose is present in a form strongly bound to lignin and/or hemicellulose. To isolate the cellulose, a complicated and intense purification step using a strong acid or the like is required. On the other hand, β-1,3-glucans of algae and fungi are easy to purify because most of them are present alone, and it is not necessary to use a strong acid or the like. Therefore, β-1,3-glucan is less likely to depolymerize even after undergoing a purification step, and can be isolated while roughly maintaining a monodisperse state (peculiar to natural polymers) in which the molecular chain length distribution is narrow.

This monodispersity is a major feature of β-1,3-glucan as a raw material of a resin. Since this monodispersity is maintained through an acylation reaction, the resulted β-1,3-glucan derivative is less likely to have defects due to the difference in melting point. Further, since β-1,3-glucan can be isolated with higher purity than cellulose, the resulted β-1,3-glucan derivative tends to have higher transmittance than cellulose derivatives.

β-1,3-glucan may or may not have a side chain. Examples of β-1,3-glucan having a side chain include, but are not limited to, schizophyllan and lentinan. Examples of β-1,3-glucan having no side chain include, but are not limited to, curdlan and paramylon.

β-1,3-glucan may be of biological origin or may be a synthetic product. For reducing the environmental load, those derived from living organisms are preferred, and those derived from plants are more preferred. Of these, β-1,3-glucan isolated from microalgae that intracellularly synthesize β-1,3-glucan is preferred for easy isolation and purification of β-1,3-glucan.

Preferred examples of the microalgae include *Euglena* (microalga belonging to the *Euglena* phylum).

*Euglena* is easy to culture, has a fast growth cycle, and accumulates a large amount of paramylon particles as a photosynthetic product in the cell. The paramylon synthesized and accumulated by *Euglena* is β-1,3-glucan usually formed by β-1,3-bonding of 1,500 to 2,000 glucoses. Separation of β-1,3-glucan such as paramylon from microalgae can be carried out by a conventional method.

β-1,3-Glucan Derivative

In the β-1,3-glucan derivative, some hydroxyl groups in glucose constituting the main chain of β-1,3-glucan are acylated with an acyl group. In other words, the β-1,3-glucan derivative has an acyl group. Due to the presence of acyl group, (i) the arrangement of molecular chains is disturbed and the interaction between molecular chains is weakened, and (ii) the formation of hydrogen bonds between main chains with hydroxyl groups is reduced and the interaction between molecular chains is weakened. As a result, it is considered that excellent thermoplasticity and adhesiveness are exhibited.

Examples of the β-1,3-glucan derivative include β-1,3-glucan mixed esters represented by the following structural formula (2):

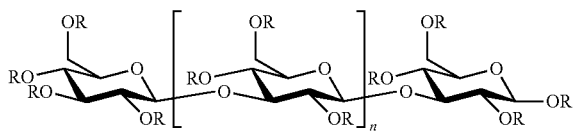

Structural Formula (2)

where each of Rs is independently a hydrogen atom or an alkylcarbonyl group, at least one of Rs is an alkylcarbonyl group, and n is a natural number.

The alkylcarbonyl group is represented by $R_1C(O)-$ (where $R_1$ is a hydrocarbon group).

Examples of the hydrocarbon group include an aliphatic hydrocarbon group and an aromatic hydrocarbon group.

The aliphatic hydrocarbon group may be straight-chain, may be branched, or may have a ring structure. The aliphatic hydrocarbon group may be a saturated aliphatic hydrocarbon group (e.g., alkyl group) or an unsaturated aliphatic hydrocarbon group (e.g., alkenyl group, alkynyl group). As the aliphatic hydrocarbon group, an alkyl group is preferred, a straight-chain or branched alkyl group is more preferred, and a straight-chain alkyl group is most preferred, for the ease of synthesis and a high degree of freedom of $R_1$.

Specific examples of the alkylcarbonyl group include, but are not limited to, acetyl group, propionyl group, isopropionyl group, butyryl group, isobutyryl group, pentanoyl group, hexanoyl group, heptanoyl group, octanoyl group, nonanoyl group, decanoyl group, lauroyl group, myristoyl group, palmitoyl group, stearoyl group, oleoyl group, linoleoyl group, and linolenoyl group.

The mass average molecular weight Mw of the β-1,3-glucan derivative is preferably $2.0 \times 10^3$ Da or more and $1.0 \times 10^6$ Da or less, and more preferably $5.0 \times 10^3$ Da or more and $5.0 \times 10^5$ Da or less. The number average molecular weight Mn of the β-1,3-glucan derivative is preferably $2.0 \times 10^3$ Da or more and $1.0 \times 10^6$ Da or less, and more preferably $5.0 \times 10^3$ Da or more and $5.0 \times 10^5$ Da or less.

In esterification, a carboxylic acid represented by the following structural formula (3) can be used. The carboxylic acid may be a synthetic product, but for reducing the environmental load, those derived from living organisms are preferred, and those derived from plants are more preferred.

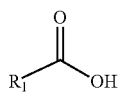

Structural Formula (3)

Phosphorus-Based Flame Retardant

A phosphorus-based flame retardant here refers to a flame retardant containing a phosphorus component. Specific examples of the phosphorus-based flame retardant include, but are not limited to, phosphate compounds, phosphazene compounds, phosphaphenanthrene compounds, phosphinic acid metal salts, ammonium polyphosphate, melamine polyphosphate, phosphoric acid esteramide, and red phosphorus. Each of these may be used alone or in combination with others.

The phosphorus-based flame retardant may be added at the time of kneading the β-1,3-glucan derivative. Alternatively, the phosphorus-based flame retardant may be kneaded with part of the β-1,3-glucan derivative or another resin in advance, and the resulted mixture may be added at the time of kneading the β-1,3-glucan derivative.

The average particle diameter of the phosphorus-based compound in the β-1,3-glucan derivative is preferably 5 μm or less.

When the average particle diameter is larger than 5 μm, dispersibility, flame retardancy, and impact strength deteriorate.

The amount of the phosphorus-based flame retardant added to 100 parts by mass of the resin is preferably from 10 to 50 parts by mass.

When it is 10 parts by mass or more, flame retardancy is sufficient. When it is 50 parts by mass or less, impact resistance is sufficient.

Other Resins and Additives

The resin composition according to an embodiment of the present invention may contain PP resin, PE resin, PC resin, PS resin, and/or ABS resin as long as flame retardancy and impact resistance are not significantly reduced. Such resins may account for 5 to 50 parts by mass of 100 parts by mass of the resin contained in the resin composition.

In addition, the resin composition according to an embodiment of the present invention may contain other additives such as phosphorus-based stabilizers, phenol-based stabilizers, dye pigments, and/or fillers as long as flame retardancy and impact resistance are not significantly reduced.

Molded Article

A molded article according to an embodiment of the present invention comprises a flame-retardant resin composition according to an embodiment of the present invention.

Examples of the molded article include, but are not limited to, members of information/mobile devices (e.g., computers, laptop computers, tablet terminals, smartphones, mobile phones) and OA devices (e.g., printers, copiers). In particular, the molded article is preferably used for exterior members that require heat resistance.

The molded article may be obtained by, for example, injection molding the resin composition according to an embodiment of the present invention in accordance with a conventional method.

Electronic Component

An electronic component according to an embodiment of the present invention comprises the molded article according to an embodiment of the present invention.

Examples of the electronic component include, but are not limited to, electronic components of information/mobile devices (e.g., computers, laptop computers, tablet terminals, smartphones, mobile phones) and OA devices (e.g., printers, copiers).

Electronic Device

An electronic device according to an embodiment of the present invention comprises the molded article according to an embodiment of the present invention.

Examples of the electronic device include, but are not limited to, information/mobile devices (e.g., computers, laptop computers, tablet terminals, smartphones, mobile phones), OA devices (e.g., printers, copiers), and home appliances (e.g., televisions, refrigerators, vacuum cleaners).

The resin composition according to an embodiment of the present invention has, when molded into a test piece, a Charpy impact strength at 23° C. of preferably 4.0 kJ/m² or higher, more preferably 6.0 kJ/m² or higher.

The Charpy impact strength is measured, in accordance with ISO 179-1, by preparing a notched impact test piece and conducting the test using a Charpy impact tester at 23° C.

Method for Producing Resin Composition

The resin composition according to an embodiment of the present invention can be obtained by kneading a β-1,3-glucan derivative with the phosphorus-based flame retardant.

As to the mixing ratio, preferably, 10 to 50 parts by mass of the phosphorus-based flame retardant are mixed with 100 parts by mass of the glucan derivative.

A method for producing the resin composition according to an embodiment of the present invention may include a melt-kneading process for melt-kneading the glucan derivative, the phosphorus-based flame retardant, optionally-added components, and other additives as needed.

Melt-Kneading Process

In the method for producing the resin composition, first, the necessary components, optionally-added components, and other additives as needed are melt-kneaded ("melt-kneading process").

This process makes the components uniformly mixed with each other.

In this process, the above components are kneaded using a kneader known in the art, such as a BANBURY MIXER, a roll, a single-screw extruder, a twin-screw extruder, and a kneader, while appropriately adjusting the conditions such as kneading speed, kneading temperature, and kneading time.

For example, the above components may be mixed in advance using a TUMBLER MIXER or a HENSCHEL MIXER, then melt-kneaded using a BANBURY MIXER, a roll, a single-screw extruder, a twin-screw extruder, or a kneader. Alternatively, the components may be put into an extruder using a feeder and then melt-kneaded, without being mixed in advance. Alternatively, only a part of the components may be mixed in advance and melt-kneaded to prepare a resin composition as a master batch, then the master batch is melt-kneaded again with the remaining components.

Preferably, the optionally-added components are melt-mixed in advance and then put into a twin-screw extruder, but the process is not limited thereto.

In particular, the kneading temperature is determined based on the melting temperature (Tm) of the glucan derivative. Like the glass transition temperature (Tg), Tm may be measured by means of DSC (differential scanning calorimetry), TMA (thermomechanical analysis), DTA (differential thermal analysis), or a rheometer capable of changing the temperature. The resin composition according to an embodiment of the present invention is easily produced by performing the kneading at around Tm that is measured by these means.

It is known that Tm and Tg vary depending on the measuring method. In the present disclosure, Tm and Tg values measured by DSC are preferred.

Embodiments of the present invention relate to the resin composition of (1) below and the items of (2) to (6) below.

(1) A resin composition comprising:
a resin including:
a β-1,3-glucan derivative resin having a main chain having a structure represented by the following structural formula (1):

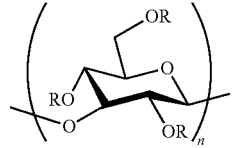

Structural Formula (1)

where each of Rs is independently a hydrogen atom or an alkylcarbonyl group, at least one of Rs is an alkylcarbonyl group, and n is a natural number; and
a phosphorus-based flame retardant,
wherein the phosphorus-based flame retardant has an average particle diameter of 5 or less in the resin.

(2) The resin composition of (1), wherein an amount of the phosphorus-based flame retardant in 100 parts by mass of the resin is from 10 to 50 parts by mass.

(3) The resin composition of (1) or (2), wherein the resin composition has a Charpy impact strength of 4.0 kJ/m² or higher at 23° C.

(4) A molded article comprising the resin composition of any one of (1) to (3).

(5) An electronic component comprising the molded article of (4)

(6) An electronic device comprising the molded article of (4).

EXAMPLES

The present invention is described in detail with reference to the following Examples but is not limited thereto.

Raw Materials

Each component used for producing the resin composition according to an embodiment of the present invention is described in detail below.

Raw Materials for Producing Derivative

β-1,3-Glucan: *Euglena*-Derived Polysaccharide

Propionic acid: Guaranteed reagent grade (product of Kanto Chemical Co., Inc.)

Butyric acid: Guaranteed reagent grade (product of Kanto Chemical Co., Inc.)

Valeric acid: Guaranteed reagent grade (product of Kanto Chemical Co., Inc.)

Hexanoic acid: Extra pure grade (product of Kanto Chemical Co., Inc.)

Phosphorus-Based Flame Retardant

PX-200: Aromatic condensed phosphate (product of DAI-HACHI CHEMICAL INDUSTRY CO., LTD.)

OP1240: Aluminum diethylphosphinate (product of Clariant Japan K.K.)

AP422: Ammonium polyphosphate (product of Clariant Japan K.K.)

SPS100: Phosphazene compound (product of Otsuka Chemical Co., Ltd.)

Production Examples of Glucan Derivative
Production of Glucan Derivative 1

A glucan derivative 1 was produced by the following processes (1) to (5).

(1) 200 g of β-1,3-glucan, 8,000 mL of trifluoroacetic anhydride, and 8,000 mL of carboxylic acid, as presented in Table 1, were allowed to react at 50° C. for 2 hours.

(2) Precipitation with a mixed solution of methanol/water was performed.

(3) Washing with a mixed solution of methanol/water was performed.

(4) Washing with ethanol was performed.

(5) Vacuum drying was performed for 24 hours to obtain a product (glucan derivative 1).

Production of Glucan Derivatives 2 to 6

Glucan derivatives 2 to 6 were synthesized in the same manner as in the production of the glucan derivative 1 except that the types of β-1,3-glucan and carboxylic acid were changed to those presented in Table 1.

TABLE 1

| Glucan Derivative Components | | Glucan Derivative No. | | | | | |
|---|---|---|---|---|---|---|---|
| | | 1 | 2 | 3 | 4 | 5 | 6 |
| β-1,3-Glucan | Paramylon | ● | ● | ● | ● | ● | |
| | Curdlan | | | | | | ● |
| Carboxylic Acid | Propionic Acid | | ● | | | ● | |
| | Butyric Acid | | | ● | | | |
| | Valeric Acid | | | | ● | | |
| | Hexanoic Acid | ● | | | | ● | ● |

Example 1

The raw materials were mixed according to the composition (part by mass) presented in Table 2-1, and kneaded at a temperature of 185° C. using a compact kneader (Mini-Labo, product of Thermo Fisher Scientific K.K.) to obtain a resin composition.

The resin composition was molded at a set temperature of 200° C. to prepare a test piece.

OP1240 and AP422 were crushed before compounding.

Examples 2 to 12 and Comparative Examples 1 to 3

The raw materials were blended according to the compositions (parts by mass) presented in Table 2-1 and Table 2-2, and resin compositions and test pieces of Examples 2 to 12 and Comparative Examples 1 to 3 were prepared in the same manner as in Example 1.

Evaluation Test Method

Average Particle Diameter of Phosphorus-Based Flame Retardant

The average particle diameter of the phosphorus-based flame retardant was measured as follows. The test piece was cut with a microtome (product of Leica), and the cut surface was photographed with a scanning electron microscope Merlin (product of Carl Zeiss AG) in 5 fields at a magnification of 5,000 times.

From the photographed images, the average particle diameter was determined as the biaxial average diameter in the entire field of view using an image analysis particle size distribution measurement software program Mac-View (product of Mountech Co., Ltd.).

The average particle diameter (L [μm]) was evaluated according to the following criteria.

A: less than 3 μm
B: 3 μm or more and 5 μm or less
C: more than 5 μm

Charpy Impact Strength

An impact test was performed according to ISO 179-1 using a Charpy impact tester.

The test piece had been notched.

Evaluation criteria (unit: kJ/m$^2$)

A: 6 or more
B: 4 or more and less than 6
C: less than 4

Flammability Test

A flame-retardancy test was performed in accordance with the UL 94 (the standard for safety of flammability of plastic materials for parts in devices) released by Underwriters Laboratories Inc. ("UL") of the United States.

The thickness t of the test piece was set to 1.5 mm.

The UL 94V test was performed to determine the classification "V-0", "V-1", or "V-2".

V-2 and above were acceptable.

TABLE 2-1

| | | Example No. | | | | | | | | | | | | |
|---|---|---|---|---|---|---|---|---|---|---|---|---|---|---|
| | | 1 | | 2 | | 3 | | 4 | | 5 | | 6 | | 7 |
| | | Glucan Derivative No. | | | | | | | | | | | | |
| | | 1 | | 2 | | 2 | | 1 | | 3 | | 4 | | 5 |
| | | Proportion | Parts | Proportion | Parts | Proportion | Parts | Proportion | Parts | Proportion | Parts | Proportion | Parts | Proportion | Parts |
| Resin | Glucan Derivative | 87.0 | 100 | 76.9 | 100 | 67.1 | 100 | 90.1 | 100 | 83.3 | 100 | 83.3 | 100 | 83.3 | 100 |
| | Polypropylene | | | | | | | | | | | | | | |
| Flame Retardant | PX200 | 0 | 0 | 23.1 | 30 | 32.9 | 49 | 0 | 0 | 16.7 | 20 | 0 | 0 | 16.7 | 20 |
| | OP1240 | 13.0 | 15 | 0 | 0 | 0 | 0 | 9.9 | 11 | 0 | 0 | 16.7 | 20 | 0 | 0 |
| | AP422 | 0 | 0 | 0 | 0 | 0 | 0 | 0 | 0 | 0 | 0 | 0 | 0 | 0 | 0 |
| | SPS100 | 0 | 0 | 0 | 0 | 0 | 0 | 0 | 0 | 0 | 0 | 0 | 0 | 0 | 0 |
| Evaluation | Average Particle Diameter (Biaxial Average Diameter) | B | | A | | A | | A | | A | | B | | A | |

TABLE 2-1-continued

| | | Example No. | | | | | | | | | | | | |
|---|---|---|---|---|---|---|---|---|---|---|---|---|---|---|
| | | 1 | | 2 | | 3 | | 4 | | 5 | | 6 | | 7 |
| | | Glucan Derivative No. | | | | | | | | | | | | |
| | | 1 | | 2 | | 2 | | 1 | | 3 | | 4 | | 5 |
| | | Proportion | Parts | Proportion | Parts | Proportion | Parts | Proportion | Parts | Proportion | Parts | Proportion | Parts | Proportion | Parts |
| | Charpy Impact Strength (kJ/m$^2$) | A | | B | | B | | A | | A | | B | | A |
| | Flame Retardancy (t 1.5 mm) | V-2 | | V-2 | | V-2 | | V-2 | | V-2 | | V-2 | | V-2 |

TABLE 2-2

| | | Example No. | | | | | | | | | | Comparative Example No. | | | | | |
|---|---|---|---|---|---|---|---|---|---|---|---|---|---|---|---|---|---|
| | | 8 | | 9 | | 10 | | 11 | | 12 | | 1 | | 2 | | 3 | |
| | | Glucan Derivative No. | | | | | | | | | | | | | | | |
| | | 5 | | 1 | | 2 | | 6 | | 1 | | 1 | | 1 | | 1 | |
| | | Proportion | Parts | Proportion | Parts | Proportion | Parts | Proportion | Parts | Proportion | Parts | Proportion | Parts | Proportion | Parts | Proportion | Parts |
| Resin | Glucan Derivative | 83.3 | 100 | 76.9 | 100 | 76.9 | 100 | 87.0 | 100 | 69.6 | 80 | 92.6 | 100 | 64.5 | 100 | 87.0 | 100 |
| | Polypropylene | | | | | | | | | 17.4 | 20 | | | | | | |
| Flame Retardant | PX200 | 0 | 0 | 0 | 0 | 0 | 0 | 0 | 0 | 0 | 0 | 0 | 0 | 0 | 0 | 0 | 0 |
| | OP1240 | 16.7 | 20 | 0 | 0 | 0 | 0 | 13.0 | 15 | 13.0 | 15 | 7.4 | 8 | 35.5 | 55 | 13.0 | 15 |
| | AP422 | 0 | 0 | 23.1 | 30 | 0 | 0 | 0 | 0 | 0 | 0 | 0 | 0 | 0 | 0 | 0 | 0 |
| | SPS100 | 0 | 0 | 0 | 0 | 23.1 | 30 | 0 | 0 | 0 | 0 | 0 | 0 | 0 | 0 | 0 | 0 |
| Evaluation | Average Particle Diameter (Biaxial Average Diameter) | B | | B | | A | | B | | B | | A | | B | | C | |
| | Charpy Impact Strength (kJ/m2) | A | | B | | B | | B | | B | | A | | C | | C | |
| | Flame Retardancy (t 1.5 mm) | V-2 | | V-2 | | V-2 | | V-2 | | V-2 | | not V-2 | | V-2 | | not V-2 | |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A resin composition comprising:
   a resin including:
      a β-1,3-glucan derivative resin having a main chain having a structure represented by the following structural formula (1):

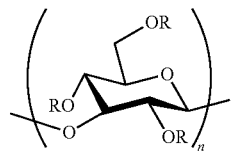

Structural Formula (1)

where each of Rs is independently a hydrogen atom or an alkylcarbonyl group, at least one of Rs is an alkylcarbonyl group, and n is a natural number, and the alkylcarbonyl group is at least one group selected from the group consisting of acetyl group, propionyl group, isopropionyl group, butyryl group, isobutyryl group, pentanoyl group, hexanoyl group, and heptanoyl group; and a phosphorus-based flame retardant,
wherein the phosphorus-based flame retardant has an average particle diameter of 5 pm or less in the resin.

2. The resin composition of claim 1, wherein an amount of the phosphorus-based flame retardant in 100 parts by mass of the resin is from 10 to 50 parts by mass.

3. The resin composition of claim 1, wherein the resin composition has a Charpy impact strength of 4.0 kJ/m$^2$ or higher at 23° C.

4. A molded article comprising the resin composition of claim 1.

5. An electronic component comprising the molded article of claim 4.

6. An electronic device comprising the molded article of claim 4.

7. The resin composition of claim 1, wherein said β-1,3 glucan derivative resin has a mass average molecular weight of $1.0 \times 10^3$ to $1.0 \times 10^6$ Da.

8. The resin composition of claim 1, wherein said β-1,3 glucan derivative resin has a mass average molecular weight of $5.0 \times 10^3$ to $5.0 \times 10^5$ Da.

9. The resin composition of claim 1, wherein said phosphorous-based flame retardant is at least one selected from the group consisting of a phosphate, a phosphazene, a phosphaphenanthrene, a phosphinic acid metal salt, an ammonium polyphosphate, melamine polyphosphate, a phosphoric acid ester amide and red phosphorous.

* * * * *